(12) United States Patent
Lindsay et al.

(10) Patent No.: US 9,826,005 B2
(45) Date of Patent: *Nov. 21, 2017

(54) DISPLAYING DEMOGRAPHIC INFORMATION OF MEMBERS DISCUSSING TOPICS IN A FORUM

(71) Applicant: Facebook, Inc., Menlo Park, CA (US)

(72) Inventors: Robert Taaffe Lindsay, San Francisco, CA (US); Blaise Andrew DiPersia, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 386 days.

This patent is subject to a terminal disclaimer.

(21) Appl. No.: 13/892,296

(22) Filed: May 12, 2013

(65) Prior Publication Data
US 2014/0068457 A1    Mar. 6, 2014

Related U.S. Application Data

(63) Continuation of application No. 12/347,476, filed on Dec. 31, 2008, now Pat. No. 8,462,160.

(51) Int. Cl.
| | |
|---|---|
| *H04L 29/06* | (2006.01) |
| *G06Q 10/10* | (2012.01) |
| *H04L 12/58* | (2006.01) |
| *G06F 17/24* | (2006.01) |
| *G06F 3/0481* | (2013.01) |
| *H04L 29/08* | (2006.01) |

(52) U.S. Cl.
CPC .......... *H04L 65/403* (2013.01); *G06Q 10/10* (2013.01); *H04L 51/00* (2013.01); *G06F 3/0481* (2013.01); *G06F 17/246* (2013.01); *H04L 67/306* (2013.01)

(58) Field of Classification Search
CPC ....................................... G06F 3/0481–3/0489
See application file for complete search history.

(56) References Cited

U.S. PATENT DOCUMENTS

| | | | |
|---|---|---|---|
| 5,636,350 | A | 6/1997 | Eick et al. |
| 6,188,403 | B1 | 2/2001 | Sacerdoti et al. |

(Continued)

OTHER PUBLICATIONS

Maletta, Hector, "Weighting," Mar. 12, 2007, http://www.spsstools.net/Tutorials/weighting.pdf.

(Continued)

*Primary Examiner* — Steven B Theriault
(74) *Attorney, Agent, or Firm* — Fenwick & West LLP

(57) ABSTRACT

Users in public forums often mention certain topics in the course of their discussions. Member's comments in messages to other members are analyzed to obtain terms that co-occur with topics. Frequencies of co-occurrence of a term with topics are normalized based on frequency of the term in a random sample of message. The terms are ranked by their normalized frequency of co-occurrence with a topic in messages. The top terms are selected based on their rank. Analysis of demographic information associated with members that mentioned top terms associated with a topic is displayed in graphical format that highlights the relationship between the age, gender, and usage of the top terms over time. The demographic information presented includes average age of members that mentioned a top term or their gender information within a selected time interval.

25 Claims, 12 Drawing Sheets

(56) References Cited

U.S. PATENT DOCUMENTS

| | | | |
|---|---|---|---|
| 6,332,143 B1 | 12/2001 | Chase | |
| 6,606,657 B1* | 8/2003 | Zilberstein et al. | 709/224 |
| 6,691,155 B2 | 2/2004 | Gottfried | |
| 6,707,454 B1* | 3/2004 | Barg et al. | 345/440 |
| 7,043,501 B2* | 5/2006 | Schiller | G06F 17/30241 |
| 7,185,065 B1 | 2/2007 | Holtzman et al. | |
| 7,412,398 B1* | 8/2008 | Bailey | G06Q 10/06375 705/7.31 |
| 7,437,370 B1* | 10/2008 | Ershov | |
| 7,523,085 B2* | 4/2009 | Nigam | G06F 17/274 706/55 |
| 7,529,743 B1* | 5/2009 | Ershov | |
| 7,613,690 B2* | 11/2009 | Chowdhury et al. | |
| 7,631,007 B2 | 12/2009 | Morris | |
| 7,752,200 B2 | 7/2010 | Scholl et al. | |
| 7,809,602 B2* | 10/2010 | Nickerson | G06Q 10/10 705/7.29 |
| 7,809,714 B1 | 10/2010 | Smith | |
| 7,853,485 B2* | 12/2010 | Song | G06F 17/30702 705/26.1 |
| 7,899,871 B1 | 3/2011 | Kumar et al. | |
| 7,917,852 B2* | 3/2011 | Wattenberg | G06F 17/30241 707/737 |
| 7,987,111 B1* | 7/2011 | Sharma | G06Q 30/02 705/7.29 |
| 8,151,194 B1* | 4/2012 | Chan | G06F 17/30817 709/224 |
| 8,280,783 B1* | 10/2012 | Brownell | G06Q 30/00 705/26.1 |
| 8,375,024 B2* | 2/2013 | Goeldi | 707/722 |
| 8,386,915 B2* | 2/2013 | Howes | G06F 17/30864 715/205 |
| 8,458,193 B1* | 6/2013 | Procopio | 707/749 |
| 8,494,897 B1* | 7/2013 | Dawson | 705/7.33 |
| 9,026,529 B1* | 5/2015 | Osofsky et al. | 707/736 |
| 9,043,302 B1* | 5/2015 | Shimshoni et al. | 707/706 |
| 9,075,870 B2* | 7/2015 | Lee | |
| 2003/0055897 A1* | 3/2003 | Brown et al. | 709/205 |
| 2004/0083127 A1 | 4/2004 | Lunsford et al. | |
| 2004/0117340 A1 | 6/2004 | Blitzer | |
| 2005/0114449 A1 | 5/2005 | Verhaeghe et al. | |
| 2005/0240618 A1* | 10/2005 | Nickerson et al. | 707/102 |
| 2006/0026152 A1 | 2/2006 | Zeng et al. | |
| 2006/0026253 A1 | 2/2006 | Kessen et al. | |
| 2006/0041536 A1 | 2/2006 | Scholl et al. | |
| 2006/0053156 A1* | 3/2006 | Kaushansky et al. | 707/102 |
| 2006/0106847 A1* | 5/2006 | Eckardt et al. | 707/101 |
| 2006/0235933 A1 | 10/2006 | Baluja et al. | |
| 2006/0259473 A1 | 11/2006 | Li et al. | |
| 2007/0043761 A1* | 2/2007 | Chim | G06F 17/30643 |
| 2007/0168448 A1 | 7/2007 | Garbow et al. | |
| 2007/0198459 A1 | 8/2007 | Boone et al. | |
| 2007/0214097 A1 | 9/2007 | Parsons et al. | |
| 2007/0226205 A1 | 9/2007 | Carrer et al. | |
| 2007/0250468 A1* | 10/2007 | Pieper | G06F 17/30867 |
| 2007/0276790 A1* | 11/2007 | Walsh et al. | 707/2 |
| 2007/0294126 A1 | 12/2007 | Maggio | |
| 2008/0036767 A1* | 2/2008 | Janzen | G06Q 10/10 345/440 |
| 2008/0071929 A1* | 3/2008 | Motte et al. | 709/246 |
| 2008/0072145 A1* | 3/2008 | Blanchard et al. | 715/273 |
| 2008/0077570 A1 | 3/2008 | Tang et al. | |
| 2008/0077582 A1* | 3/2008 | Reed | 707/5 |
| 2008/0092044 A1* | 4/2008 | Lewis et al. | 715/713 |
| 2008/0098311 A1* | 4/2008 | Delarue et al. | 715/739 |
| 2008/0104225 A1* | 5/2008 | Zhang | H04L 67/36 709/224 |
| 2008/0109397 A1* | 5/2008 | Sharma et al. | 707/1 |
| 2008/0154883 A1* | 6/2008 | Chowdhury | G06F 3/0482 |
| 2008/0177600 A1 | 7/2008 | McCarthy et al. | |
| 2008/0209350 A1* | 8/2008 | Sobotka | G06F 3/0482 715/762 |
| 2008/0215541 A1 | 9/2008 | Li et al. | |
| 2008/0215607 A1* | 9/2008 | Kaushansky et al. | 707/102 |
| 2008/0231644 A1* | 9/2008 | Lempel et al. | 345/689 |
| 2008/0256444 A1* | 10/2008 | Wang | G06F 17/30864 715/700 |
| 2008/0294624 A1 | 11/2008 | Kanigsberg et al. | |
| 2008/0306826 A1* | 12/2008 | Kramer | G06Q 30/02 705/14.14 |
| 2009/0024612 A1 | 1/2009 | Tang et al. | |
| 2009/0063481 A1 | 3/2009 | Faus et al. | |
| 2009/0094190 A1* | 4/2009 | Stephens | 707/2 |
| 2009/0106070 A1* | 4/2009 | Konar | 705/8 |
| 2009/0119156 A1* | 5/2009 | Dulepet | G06Q 30/0201 705/7.29 |
| 2009/0119157 A1* | 5/2009 | Dulepet | G06F 17/2785 705/7.29 |
| 2009/0138427 A1* | 5/2009 | Kalavade | G06Q 10/0637 |
| 2009/0158146 A1* | 6/2009 | Curtis et al. | 715/700 |
| 2009/0164449 A1 | 6/2009 | Huang | |
| 2009/0235267 A1* | 9/2009 | McKinney et al. | 718/104 |
| 2009/0287694 A1* | 11/2009 | McGowan et al. | 707/5 |
| 2009/0287989 A1* | 11/2009 | Chakra et al. | 715/205 |
| 2009/0319518 A1* | 12/2009 | Koudas et al. | 707/5 |
| 2010/0030648 A1* | 2/2010 | Manolescu et al. | 705/14.66 |
| 2010/0043021 A1* | 2/2010 | Torsiello | H04H 60/31 725/14 |
| 2010/0070860 A1* | 3/2010 | Alkov et al. | 715/716 |
| 2010/0094887 A1 | 4/2010 | Ye et al. | |
| 2010/0145954 A1* | 6/2010 | Barlin | G06F 17/3087 707/754 |
| 2010/0153107 A1* | 6/2010 | Kawai | 704/240 |
| 2010/0162152 A1* | 6/2010 | Allyn | G06T 11/206 715/767 |
| 2010/0205541 A1* | 8/2010 | Rapaport et al. | 715/753 |
| 2010/0332465 A1* | 12/2010 | Janssens | G06Q 30/02 707/722 |
| 2011/0022602 A1* | 1/2011 | Luo et al. | 707/748 |
| 2011/0218946 A1* | 9/2011 | Stern et al. | 706/12 |
| 2011/0320715 A1* | 12/2011 | Ickman et al. | 711/118 |
| 2014/0280017 A1* | 9/2014 | Indarapu et al. | 707/711 |

OTHER PUBLICATIONS

PCT International Search Report and Written Opinion, PCT Application No. PCT/US2009/065000, dated Jan. 14, 2010, seven pages.
PCT International Search Report and Written Opinion, PCT Application No. PCT/US2009/065005, dated Jan. 13, 2010, five pages.
United States Patent and Trademark Office, Non-Final Rejection, U.S. Appl. No. 12/347,476, dated Dec. 28, 2011, 21 Pages.
United States Patent and Trademark Office, Non-Final Rejection, U.S. Appl. No. 12/347,476, dated Aug. 13, 2012, 23 Pages.
United States Patent and Trademark Office, Decision on Appeal, U.S. Appl. No. 12/347,473, Appeal No. 2013-011038, Dec. 22, 2015, eight pages.

* cited by examiner

DISPLAYING DEMOGRAPHIC INFORMATION OF MEMBERS DISCUSSING TOPICS IN A FORUM

CROSS-REFERENCE TO RELATED APPLICATIONS

This application is a continuation of U.S. patent application Ser. No. 12/347,476, titled "Displaying Demographic Information of Members Discussing Topics in a Forum" filed on Dec. 31, 2008, which is incorporated by reference herein in its entirety.

FIELD OF THE INVENTION

This invention relates to identifying and presenting information associated with topic related discourse in forums such as social networks, blogs, and bulletin boards and the like that allow users to exchange information with other users.

BACKGROUND

Opinion polls, surveys, focus groups and other approaches are used in all areas of public interest, to identify how people perceive certain topics in various domains, from politics and economics to sports and entertainment. For example, political analysts use opinion polls to learn voters' opinions about politicians, the economy, legislation, and the like. Marketing agencies conduct interest groups and surveys to learn shoppers' opinions on products and services from one or more manufacturers.

In particular, vendors that spend huge amount of resources in building brand names and making them popular are interested in understanding how people perceive their brand names and associated products. People interested in analyzing how people perceive certain topics are also interested in knowing how the perception of people varies by demographic parameters such as age, gender, race, or geographic region. For example, information such as, how a product is received in the market, how the popularity of a product varies by geographical regions or demographics, all is useful to informing the vendor about the public's perception of the brand. Conventional mechanisms to obtain this type of information include surveys and focus groups.

Information obtained through surveys has several drawbacks. For example, it is difficult to get information from people who are too busy to respond to surveys although their feedback may be valuable. Surveys have predetermined questions that may already be biased by the opinions of designers of the survey. The context in which a person fills a survey is not the most natural setting for a person. For example, sometimes people are given incentives to fill out surveys, and people may be more interested in the incentive rather than presenting an honest opinion in the survey. Typically surveys provide a section for providing general comments in free-form text, but a person needs time and creativity to express their opinions clearly in such a section. Also, if a large number of surveys are collected, the surveyor is faced with the task of analyzing a large amount of free-form text to find the key information of interest.

Focus groups are another way vendors obtain information about their brands. However, focus groups are expensive to conduct, and by their nature are limited to a relatively small number of participants, dozens, perhaps hundreds. While attempts can be made to ensure that the focus group participants are representative of a target population at large, the resulting information is still not necessarily reflective of the actual perceptions of people in the general population. One reason for this is that like surveys, focus groups are by their nature highly controlled environments, and so the discussions and opinions of the individuals may reflect biases introduced by the questions presented to the focus group, or biases from the participants who are obtaining some form of compensation to participate.

SUMMARY

A social networking website allows members to exchange information with other members of the website. Members of a social network have some form of social relationship with each other, such as being friends or acquaintances in some social context. The social networking website also stores demographic information about the members. Members communicate with other members using various messaging facilities in the social network, thereby engaging in conversations and other information exchanges. Members of social networks occasionally refer to certain topics during their communications with each other. For example, members may refer to brand names and products of vendors, politicians, television programs, movies, celebrities and the like. Such information is very valuable for analyzing these topics as they arise during ordinary discourse. The social networking website stores such communications (in the form of messages or other information exchanges, between users). The messages exchanged by the members are analyzed to obtain information associated with topics and such information is classified based on the demographics of the members contributing to the information. The resulting information represents how members of the social network actually use a topic in their normal discourse with other members, as well as how such use varies according to the members' demographics.

A list of keywords corresponding to topics is collected. The topic provider is interested in analyzing how members of social network perceive the topics in their normal discourse with other members. For example, advertisers provide a list of keywords that corresponds to brand names and products for which advertisers would like to get information regarding how members of the social network use the brand names and products. Other examples of topic keywords can be lists of politician's names, common terms associated with political, social, legal, or economic issues, or any other list of keywords or topics. Messages exchanged by the members that contain a particular keyword provided by the advertisers are identified. Various words and phrases that occur in the messages along with the keyword provided by the advertisers are collected. Certain words and phrases that occur along with the keyword may occur very frequently but may not be of importance because they may be common words that appear in most conversations. The frequency of occurrence of words or phrases that co-occur with the topics is analyzed and weighted based on estimated significance of the words or phrases. Only the significant words/phrases that co-occur with the topics called the top terms are identified for analytic purposes.

A mechanism is provided to analyze the words or phrases that co-occur with each topic in the conversations of the members based on demographic information associated with the member that contributed to the word or phrase. For example, the frequency of occurrence of a word or phrase based can be analyzed based on the age or the gender or the geographical location of the member that mentioned the word or phrase. The mechanism to analyze words or phrases associated with topics can be used with messages exchanged by members in any public forum. A public forum can be any system that allows members to communicate with each other using messages that may be visible to other members, for example, internet forums, blogs, and bulletin boards.

Analysis of demographic information associated with members that mentioned top terms associated with a topic can be displayed in graphical format that highlights the relationship between the age, gender, and usage of the top terms over time. One or more axes of the graph display demographic information associated with the users and the data points represent top terms. The demographic information presented includes aggregate demographic values, for example, average age of members that mentioned a top term or percentage of male (or female) population that mentioned the top term. The top terms may be displayed using icons such that the size of an icon in indicative of the frequency of co-occurrence of the top term with the topic. An embodiment presents demographic information including weighted average of demographic information associated with members such that underrepresented groups of members in the forum with regards to the demographic information are given higher weights. A user interface control to input a time value can be provided to allow graphical display of analytical information based on messages sent or received during different time intervals.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Social Networking Website

A social networking website offers its members the ability to communicate and interact with other members of the website. In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social networking website.

In addition to interactions with other members, the social networking website provides members with the ability to take actions on various types of items supported by the website. These items may include groups or networks (where "networks" here refer not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. These are just a few examples of the items upon which a member may act on a social networking website, and many others are possible.

Figure 1:
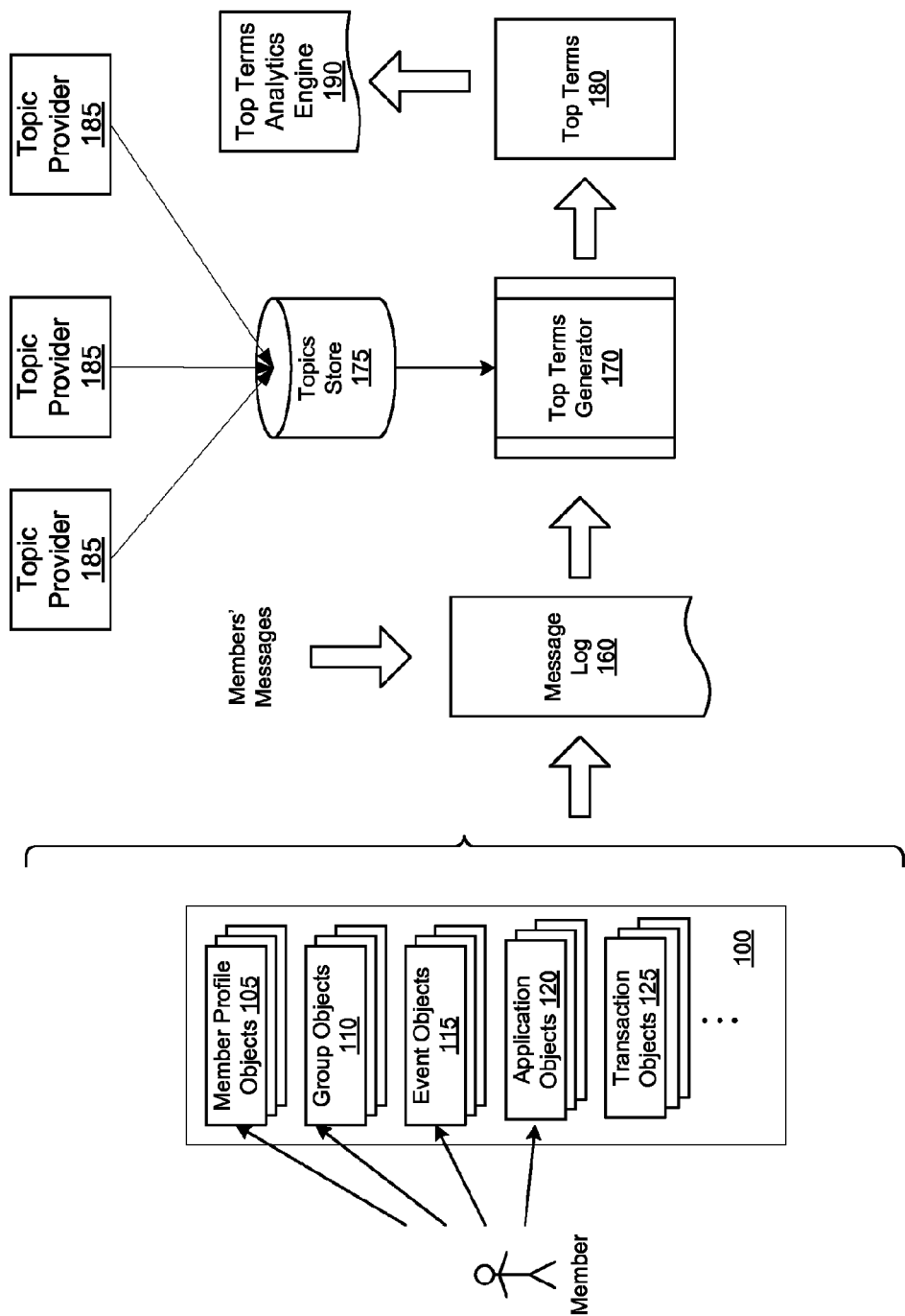
FIG. 1 is high-level diagram illustrating the interaction of users with the applications on a social networking website.

As illustrated in FIG. 1, the social networking website 100 maintains a number of objects for the different kinds of items with which a member may interact on the website 100. In one example embodiment, these objects include member profiles 105, group objects 110, event objects 115, transaction objects 125 (respectively, hereinafter, groups 110, events 115, and transactions 125). In one embodiment, an object is stored by the website 100 for each instance of its associated item. For example, a member profile 105 is stored for each member who joins the website 100, a group 110 is stored for each group defined in the website 100, and so on. The types of objects and the data stored for each is described in more detail below in connection with FIG. 1.

The member of the website 100 may take specific actions on the website 100, where each action is associated with one or more objects. The types of actions that a member may perform in connection with an object is defined for each object and largely depends on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features can be provided on a social networking website 100.

A group 110 may be defined for a group or network of members. For example, a member may define a group to be a fan club for a particular band. The website 100 would maintain a group 110 for that fan club, which might include information about the band, media content (e.g., songs or music videos) by the band, and discussion boards on which members of the group can comment about the band. Accordingly, member actions that are possible with respect to a group 110 might include joining the group, viewing the content, listening to songs, watching videos, and posting a message on the discussion board.

Similarly, an event 115 may be defined for a particular event, such as a birthday party. A member may create the event 115 by defining information about the event such as the time and place and a list of invitees. Other members may accept the invitation, comment about the event, post their own content (e.g., pictures from the event), and perform any other actions enabled by the website 100 for the event 115. Accordingly, the creator of the event 115 as well as the invitees for the event may perform various actions that are associated with that event 115.

Another type of object shown in the example of FIG. 1 is a transaction 125. A transaction object enables members to make transactions, such as buying, selling, renting, trading, or exchanging with other members. For example, a member may post a classified ad on the social networking website 100 to sell a car. The member would thus define a new transaction 125, which may include a description of the car, a picture, and an asking price. Other members can then view this information and possibly interact further with the transaction 125 by posting questions about the car and accepting the offer or making a counteroffer. Each of these interactions—view, question posting, offer, and counteroffer—are actions that are associated with the particular transaction 125.

The social networking website 100 maintains a member profile 105 for each member of the website 100. The member profile contains demographic information such as age, gender, education, marital status, and financial information associated with the member. Members send messages to other members for interaction and any message that a particular member sends to another member is associated with the profile 105 of the member that sent the message through information maintained in a database or other data repository, such as the message log 160. Such messages may include, for example, a message posted on a discussion board, email communications with other members and the like.

The topic store 175 stores keywords provided by topic providers 185 that the topic providers are interested in analyzing. For example, political analysts may provide topics related to politics or sports enthusiasts may provide topics related to sports. Each topic provider 185 can provide one or more topic keywords that they are interested in tracking. The topic store 175 stores the association between the topics and the topics provider 185 that provided the topic.

One source of topic terms is those that are related to products and brands. Members of social networks occasionally refer to brand names and products of vendors during their communications with each other. This information is very valuable for vendors that spend significant amount of resources in advertising for building brand names for their products since such information arises during ordinary discourse between current and potential users of the vendors' products. This information represents how members of the social network actually use a vendor's brand names in their normal discourse with other members.

The messages sent by the members to other members are analyzed by the top terms generator 170 to identify the topics provided by topics provider 185. The top terms generator 170 extracts significant words and phrases (herein "terms") that co-occur with the topics provided by the topics provider 185. The terms associated with the topics are ranked in order of their significance and the most significant terms, called the top terms 180 are computed by the top terms generator 170.

The top terms 180 computed by the top terms generator 170 are further analyzed by the top terms analytic engine 190 in view of the demographics of the members that provided the messages that contained a given top term. This analysis contains valuable information, for example, the distribution of the use of a top term by the age and gender of the members that used the top term in a message. The top terms analytic engine 190 presents information in a graphical user interface that presents the information in an easy to understand fashion.

System Architecture

Figure 2:
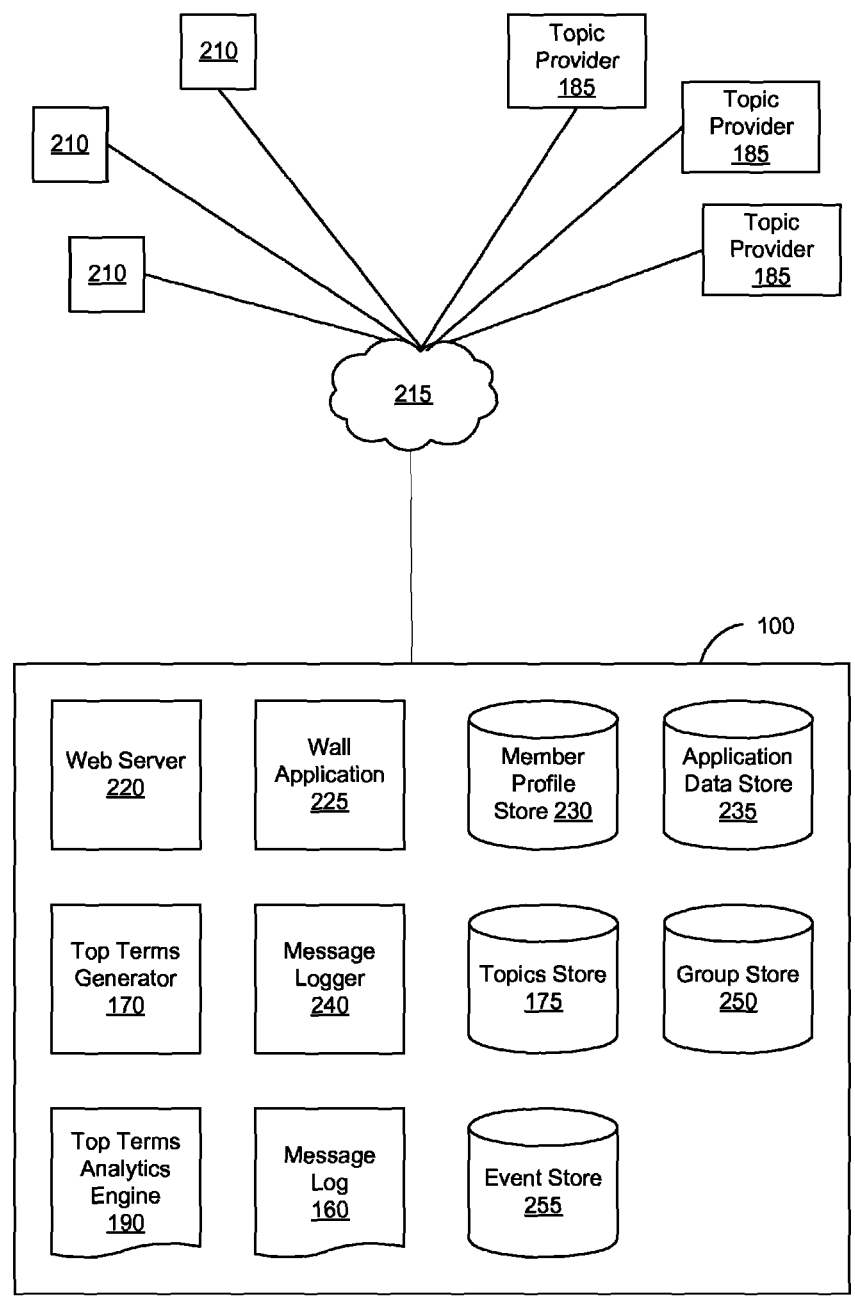
FIG. 2 is the architecture of the system that tracks brand related discourse in a social network.

FIG. 2 is a high level block diagram illustrating a system environment suitable for operation of a social networking website 100. The system environment comprises one or more client devices 210, one or more topic providers 185, a social networking website 100, and a network 215. In alternative configurations, different and/or additional modules can be included in the system.

The client devices 210 comprise one or more computing devices that can receive member input and can transmit and receive data via the network 215. For example, the client devices 210 may be desktop computers, laptop computers, smart phones, personal digital assistants (PDAs), or any other device including computing functionality and data communication capabilities. The client devices 210 are configured to communicate via network 215, which may comprise any combination of local area and/or wide area networks, using both wired and wireless communication systems.

The social networking website 100 comprises a computing system that allows members to communicate or otherwise interact with each other and access content as described herein. The social networking website 100 stores member profiles 105 in the member profile store 230 that describe the members of a social network, including biographic, demographic, and other types of descriptive information, such as age, gender, work experience, educational history, hobbies or preferences, location, and the like. The website 100 further stores data describing one or more relationships between different members. The relationship information may indicate members who have similar or common work experience, group memberships, hobbies, or educational history. Additionally, the social network host site 100 includes member-defined relationships between different members, allowing members to specify their relationships with other members. For example, these member defined relationships allow members to generate relationships with other members that parallel the members' real-life relationships, such as friends, co-workers, partners, and so forth. Members may select from predefined types of relationships, or define their own relationship types as needed.

The social networking website 100 includes a web server 220, a wall application 225, a top terms generator 170, a message logger 240, a top terms analytic engine 190, a message log 160, a member profile store 230, an application data store 235, a topics store 245, a group store 250, and an event store 255. In other embodiments, the social networking website 100 may include additional, fewer, or different modules for various applications. Conventional components such as network interfaces, security mechanisms, load balancers, failover servers, management and network operations consoles, and the like are not shown so as to not obscure the details of the system.

The web server 220 links the social networking website 100 via the network 215 to one or more client devices 210; the web server 220 serves web pages, as well as other web-related content, such as Java, Flash, XML, and so forth. The web server 220 may include a mail server or other messaging functionality for receiving and routing messages between the social networking website 100 and the client devices 210. The messages can be instant messages, queued messages (e.g., email), text and SMS messages, or any other suitable messaging technique.

Figure 5:
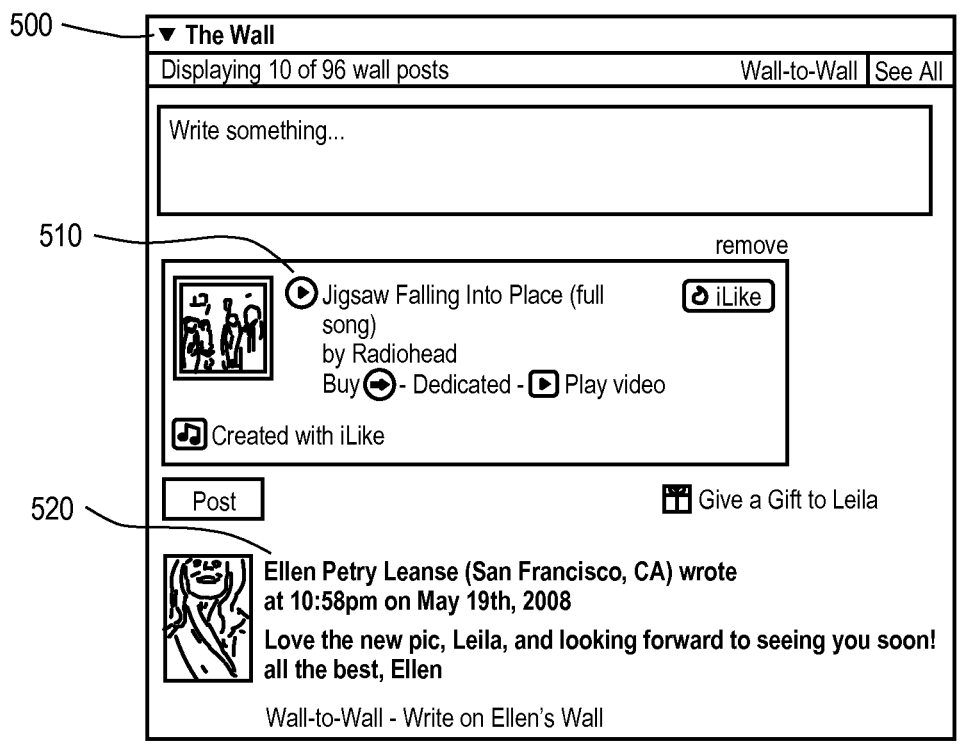
FIG. 5 shows an example of a message posted on a social networking website.

The wall application 225 is an application provided by the social networking website that allows members to post messages for other members. A member can post on his or her own wall, as well as walls of the member's friends. Any friend of a member or a friend of a friend of the member or any member of the social network can see what is written on the member's wall depending on the privacy settings of the member. For example a member may post a message to the member's friend informing the friend about a movie that the member watched or about a restaurant that the member went to. FIG. 5 shows an example of a wall 500 and a posting 510 by an application called iLike as well as a posting 520 by a member's friend on the member's wall.

The message logger 240 is capable of receiving communications from the web server 220 about messages sent by members to other members such as the messages posted using the wall application. The message logger 240 populates the message log 160 with information about each message, including the text of each message, metadata associated with each message, and information that allows linking the message to the member profile 105 of the member who posted the member.

As discussed above, the social networking website 100 maintains data about a number of different types of objects with which a member may interact on the website 100. To this end, each of the member profile store 230, application data store 235, the topics store 175, the group store 250, and the event store 255 stores instances of the corresponding type of object maintained by the website 100. Each object type has information fields that are suitable for storing the information appropriate to the type of object. For example, the event store 255 contains data structures that include the time and location for an event, whereas the member profile store 230 contains data structures with fields suitable for describing a member's profile. The topics store contains data structures and fields suitable for describing the topics that the topics providers 185 would like to track. When a new object of a particular type is created, the website 100 initializes a new data structure of the corresponding type, assigns a unique object identifier to it, and begins to add data to the object as needed. This might occur, for example, when a member defines a new event, wherein the website 100 would generate a new instance of an event in the event store 255, assign a unique identifier to the event, and begin to populate the fields of the event with information provided by the member.

The top terms generator 170 uses the information available in the message log 160 and the topics available in the topics store 175 to generate the significant top terms 180 that co-occur with the topics in the messages. The top terms analytics engine 190 provides analysis of statistical information associated with the top terms 180 computed by the top terms generator 170 based on information comprising the demographics of the members that contributed to the top terms.

Top Term Calculation

Figure 3:
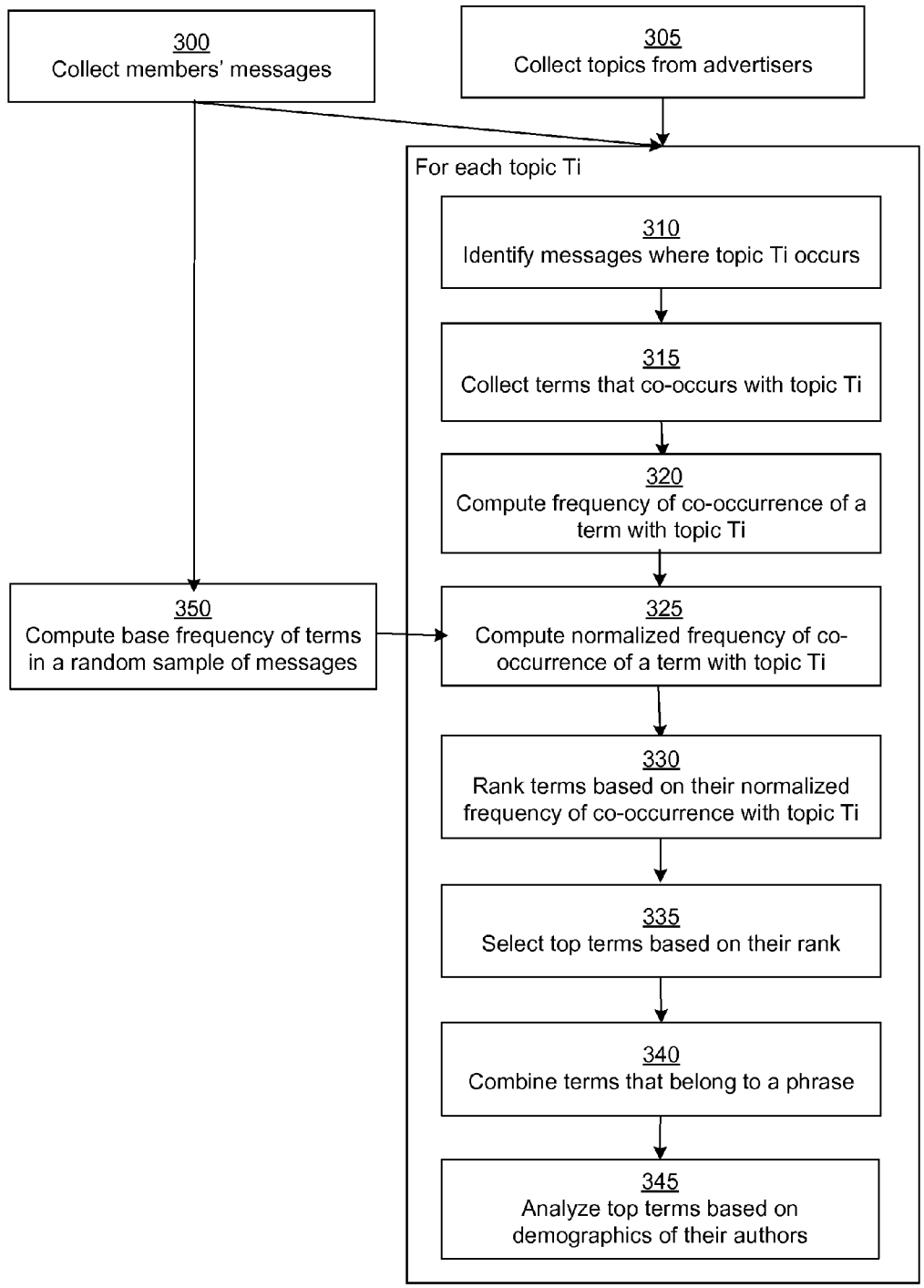
FIG. 3 is a flowchart of the overall process used for collecting information based on topics using an embodiment of the invention.

FIG. 3 describes the overall process used for analyzing top terms 180 associated with topics provided by the topics provider 185 to the social networking website. As a preliminary operation, the social networking website collects 300 messages provided by members on an ongoing basis and stores them in the message log 160. Each message stored in the message log 160 is associated with the member profile 105 of the member who provided the message. The social networking website also receives 305 topics from one or more topics provider 185 that each such topics provider 185 is interested in tracking. Each of the topics received from the topics providers 185 are stored in the topic store 175.

Given the message log 160 (or any portion thereof) and the topic store 175, the following process is performed by the top terms generator 170 for each topic (or for each of a selected subset of topics) stored in the topic store 175. The top terms generator 170 identifies 310 all messages in message log 160 that mention the topic being tracked, e.g., where the topic is included in the text of the message. This identification 310 may be done by a scan of the messages in the message log 160 or by use of an index. Naturally, each such message contains words and phrases other than the topic being analyzed. A phrase is characterized by a sequence of n words from the message called an n-gram. A phrase that is a sequence of two words is called a bigram and a phrase that is a sequence of three words is called a trigram. An embodiment of the invention collects 315 all the words and bigrams that occur in the messages that mention the given topic. Other embodiments may collect 315 n-grams with more than two words, for example trigrams. These words and phrases that co-occur with the topic in the message are called "terms." The terms are preferably filtered to exclude stop words (e.g., preposition, articles, and the like) unless the stop word occurs as part of longer term.

The top terms generator 170 further computes 320 the co-occurrence frequency of terms that co-occur with the given topic by calculating the number of times a term occurs in the messages where the given topic was mentioned. This frequency provides a measure of the popularity of the term mentioned in conjunction with the given topic. The frequency of co-occurrence of a term with a topic is used to compute 325 a normalized frequency of co-occurrence of the term with the topic. In one embodiment, the normalized frequency is the ratio of the frequency of co-occurrence of the term with the given topic and the base frequency of occurrence of the term. The base frequency is computed 350 based on an estimate of the number of occurrences of the term in a sample of messages. Other ways of normalizing co-occurrence frequencies can be used as well.

All terms that co-occur with a given topic can be ranked 330 by their respective normalized co-occurrence frequency values. The top ranked terms are selected 335 and are deemed the significant terms of interest to the advertiser that provided the topic and are called "top terms" 180. Analysis may be performed to combine 340 terms that are likely to belong to a larger phrase. For example, a phrase including more than two words results in multiple bigrams formed by subsequences of two words that form part of the larger phrase. For example, the phrase "four score and seven" results in three different bigrams, "four score," "score and," "and seven." These bigrams are not separate phrases but are parts of a larger phrase and should be associated together. The top terms analytics engine 190 performs analysis 345 of the top terms 180 associated with a topic Ti based on demographics of the authors of the messages containing the top terms 180.

One embodiment associates two terms t1 and t2 that are contained in a larger phrase by comparing the sets of members that authored the messages containing the terms. Assume that the set of members that authored messages containing t1 is S1 and the set of members that authored messages containing t2 is S2. A score called "set dissimilarity score" of the terms t1 and t2, SS(t1, t2) is computed for t1 and t2 based on the Jaccard distance between the sets S1 and S2 as follows:

$$SS(t1, t2) = 1 - \frac{|S1 \cap S2|}{|S1 \cup S2|}$$

Where:

$|S1 \cap S2|$ is the number of elements in the intersection of the sets S1 and S2

$|S1 \cup S2|$ is the number of elements in the union of the sets S1 and S2

The size of the intersection set of S1 and S2 is a measure of the number of members that mentioned both the terms t1 and t2 in a message. This number includes all members that used the two terms as part of a phrase, since a message containing the phrase must contain both the terms t1 and t2. The size of the union of the sets S1 and S2 is a measure of the number of members that mentioned either t1 or t2 or both. If the two terms are likely to occur only as part of a larger phrase and not as individual terms, the value of $|S1 \cup S2|$ is close to the value of $|S1 \cap S2|$ and the ratio of $|S1 \cap S2|$ and $|S1 \cup S2|$ has a value close to 1. The set dissimilarity score is computed by subtracting the ratio of $|S1 \cap S2|$ and $|S1 \cup S2|$ from 1.

Smaller values of the set dissimilarity score SS(t1, t2) indicate that the sets S1 and S2 are similar. If the value of SS(t1, t2) is below a predetermined threshold, the terms t1 and t2 are considered part of a larger phrase and are treated as one term t12. For example, the terms "four score" and "score and" may be combined into a new term "four score, score and". The number of occurrences of the combined term t12 is determined using a heuristic computation based on S1 and S2. One embodiment uses the smaller of the two sets S1 and S2 as the member set for the merged term t12. The combined term t12 is then compared to the rest of the top terms 180 to find other terms that may be combined with t12. This process is repeated multiple times so as to combine all terms that occur as part of larger phrases or quotes.

Figure 4:
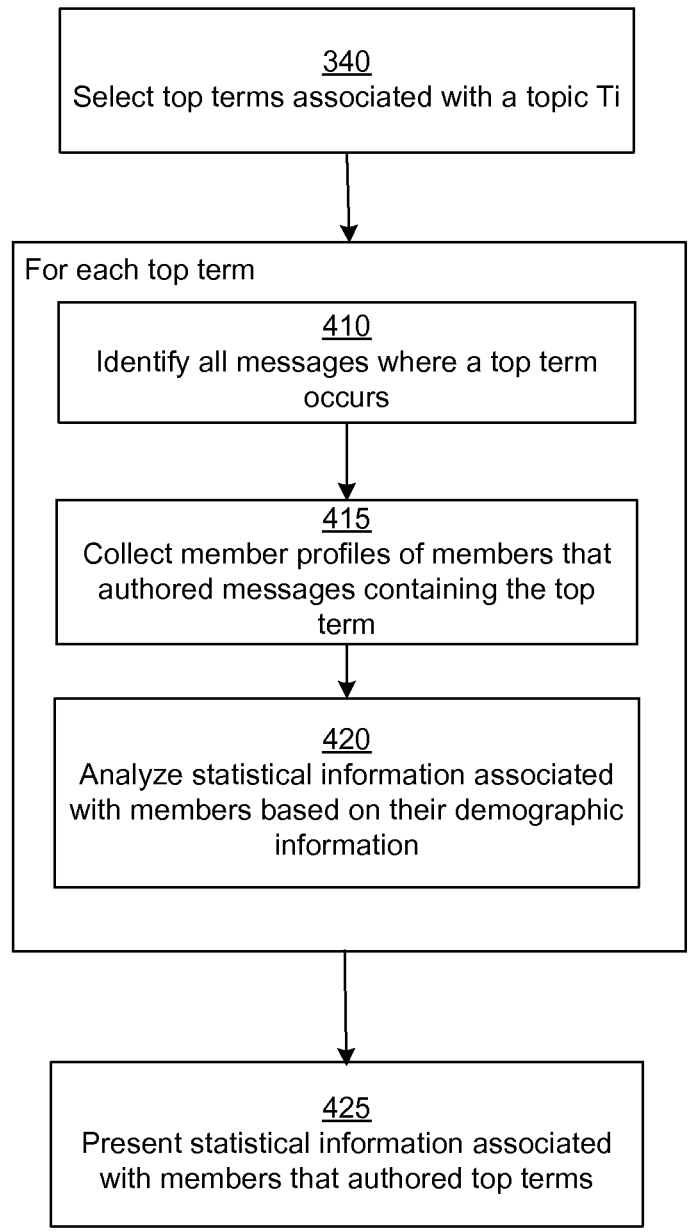
FIG. 4 is a flowchart of the process used for analyzing and presenting statistical information associated with top terms.

Each occurrence of a term is associated with a message and therefore with the member profile of the member that provided the message. This correlation is used to further calculate statistical information relating the term to the demographic information of the member that provided the message containing the term. FIG. 4 shows a flowchart of the process used for analyzing statistical information associated with the top terms 180. Assuming the top terms associated with a topic Ti have been selected, the following computation may be performed for each top term. All messages containing a specific top term 180 are identified 410. This identification 410 may be done by a scan of the messages in the message log 160 or by use of an index. The member profiles of members that authored the messages containing the top term are collected 415. Based on the attributes of the member profiles such as their age, gender, geographical location and the like, the statistical information associated with the members is analyzed 420 by the top term analytic engine 190. The analysis of statistical information may be presented on a graphical display. An example of demographics based analysis of a top term is analysis based on gender of the authors of the messages that contained the top term 180. For example, information may be gathered that X % of the members that contributed to the term are male as opposed to 100−X % of members that are female. Similarly statistical information regarding the distribution of the frequency of the term based on the age of the member that provided the term can be presented.

Presentation of Top Terms

Figure 6:
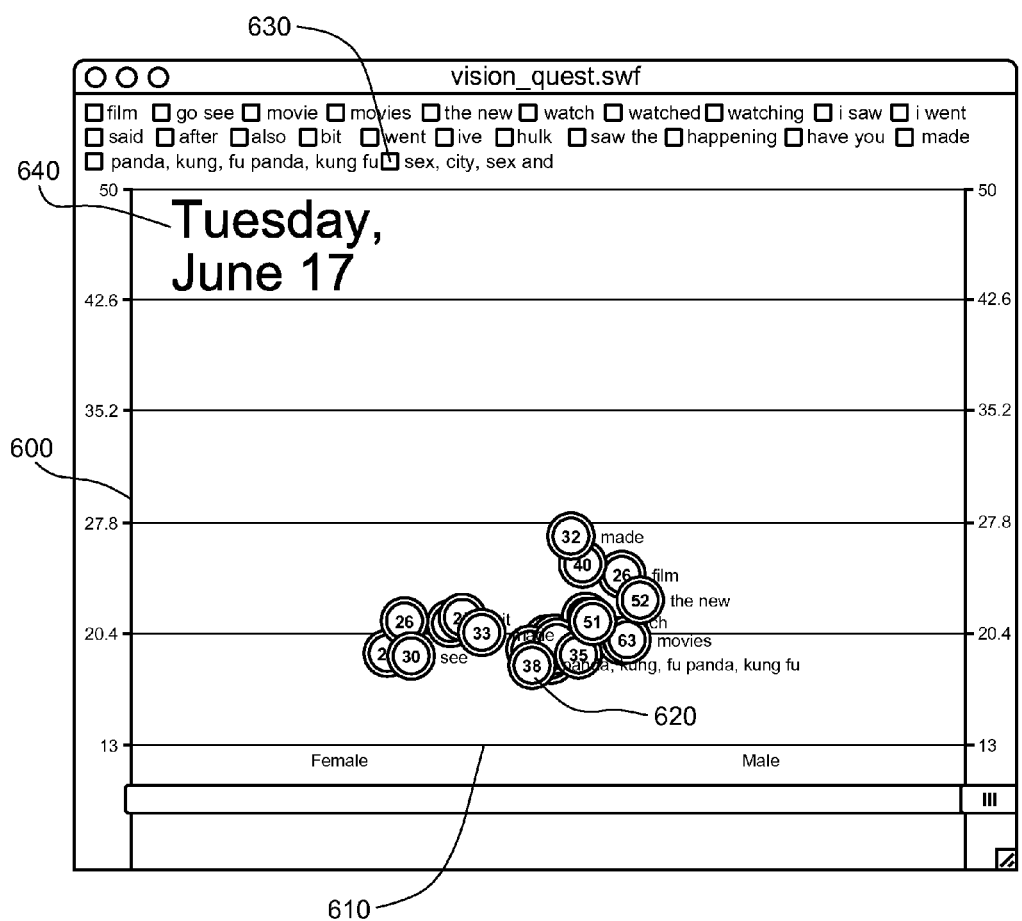
FIG. 6 is an illustration of a graphical user interface showing age and gender distribution of top terms.

FIG. 6 provides a graphical display of the statistical information related to terms obtained from a social networking website for a topic "Hancock", which is the name of a movie released in the time frame during which the messages were collected. The X-axis 610 of the graph represents the distribution of the terms by the gender of the members contributing to a term and the Y-axis 600 represents the distribution of the term by the age of the members contributing to a term. The date 640 displays the time period during which messages used for the analysis shown in FIG. 6 were collected. The graphical display shows a circle 620 corresponding to each term and displays the normalized frequency of the term in the circle 620. Another embodiment can use a different icon to represent each data point. An embodiment displays different terms using different colored icons to distinguish them. The top terms 180 are displayed along with checkboxes 630 that enable the user to select a subset of the terms and redraw the graphical display based on the selected terms.

The top terms analytic engine 190 receives the data associated with the top terms 180 and determines how the data is presented. Instead of the entire list of top terms, a subset may be displayed based on selections of top terms indicated using checkboxes 630. The x-axis 610 and y-axis 600 may either display the entire range of possible values of the co-ordinates or a sub-range. If a sub-range of values of x and y coordinates needs to be displayed, the sub-range can be determined based on the x and y coordinate values of the top terms that need to be displayed. For example, if all top terms that need to be displayed occur within a small range of x and y coordinate values, the corresponding range of x and y axes can be displayed instead of the entire range. Alternatively, the ranges of the axes displayed can be determined based on user input. For example, the user may be allowed to specify a region of the graphical display that the user is interested in focusing on. The ranges of x and y coordinate values corresponding to the region selected by the user is presented in the graphical display.

For each top term 180 that is determined to be displayed, the x and y coordinate values, in the coordinate space, corresponding to the top term are calculated to determine the location of the term on the graphical display. For example, for the graphical display shown in FIG. 7, for each top term, the x coordinate is based on the percent of male members that mentioned the term, and the y coordinate is based on the average age of the members that mentioned the terms. Alternative embodiments can display a graph with axes based on other kinds of aggregate demographic values.

Figure 7:
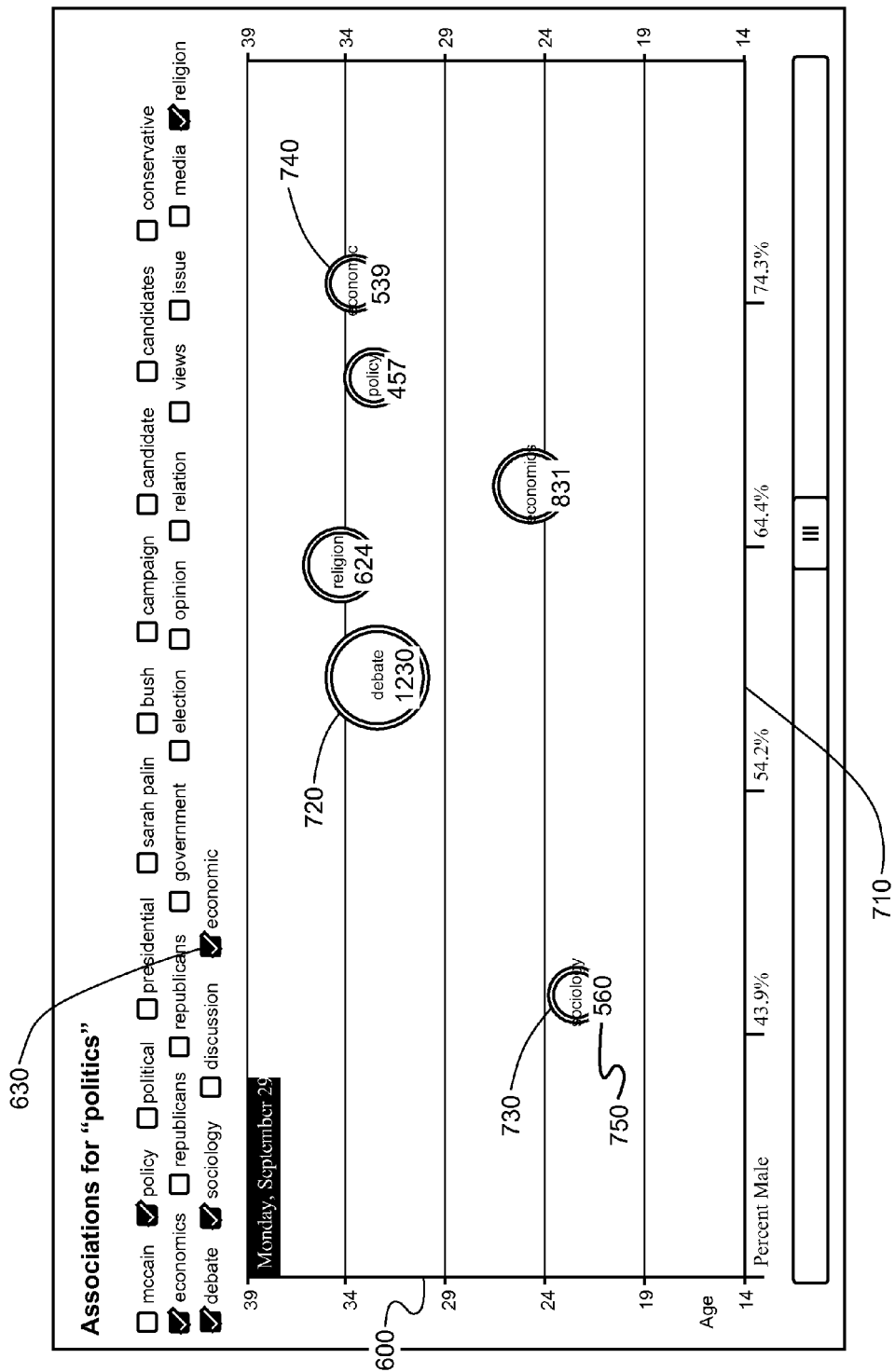
FIG. 7 is an illustration of a graphical user interface showing age and gender distribution of specific top terms selected by a user for topic "politics."
Figure 11:
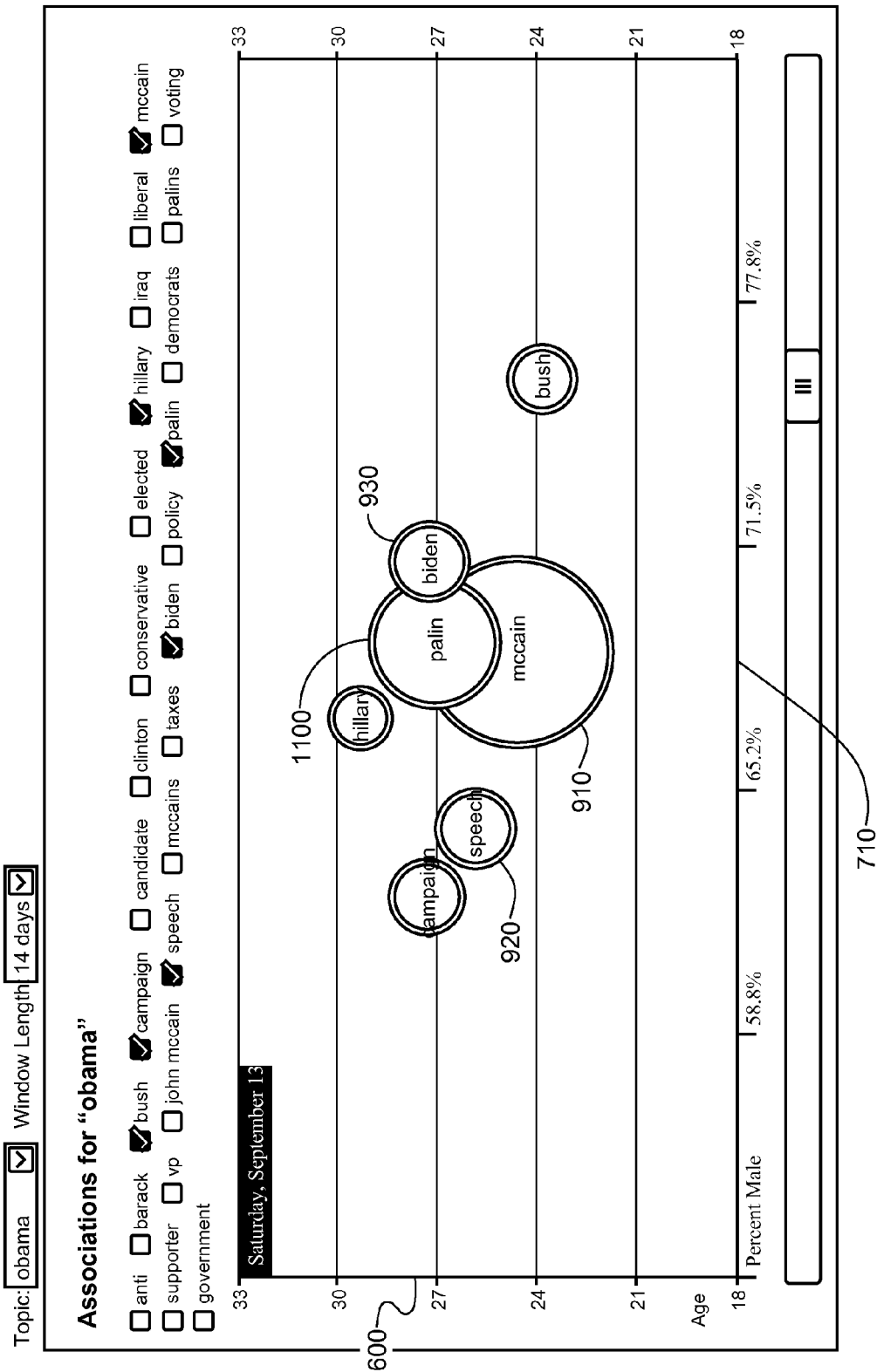

After determining the coordinate values associated with each top term, the pixel location corresponding to each axis is determined for each top term. This is done by scaling the coordinate value in the coordinate space relative to its corresponding axis into a pixel value, and using that as an offset from the origin of the display. For example, in FIG. 7, the age value associated with a top term is scaled to a pixel location along the y axis and the percent male population value associated with the top term is scaled to a location along the x-axis. As illustrated in FIG. 7, the term "sociology" corresponding to circle 730 is positioned to have a 44% x-coordinate value and 22 years average age value. The size of the icon used to display a top term is determined based on the frequency value associated with the top term. The available range of frequency values is divided into ranges where each range is assigned a size value for an icon. The maximum size of an icon is limited to a predetermined value to avoid extremely large icons due to large frequency values resulting in aesthetically unpleasant graphical display. The icons corresponding to the terms to be displayed are assigned a color value. The color values are assigned to icons to visually distinguish icons displayed close together or icons overlapping each other by displaying them with different colors. For example, in FIG. 8, the terms represented by icons 835 and 830 are displayed close together and hence have different colors. Similarly, the terms 840 and 850 are displayed by different colors to distinguish the two terms. However, the terms 840, 860, and 835 are represented by the same color since they are not displayed close to each other. For overlapping icons, the larger icons are placed behind smaller icons so as not to obscure them. For example, in FIG. 11, the icons 910, 1100, and 930 are overlapping. Of the three overlapping icons, 910 is the largest icon, 1100 the next largest, and 930 the smallest. The largest icon 910 is displayed behind the icon 1100 which is displayed behind the icon 930. The graph is then formatted for displaying based on the determined positions of the icons corresponding to the terms displayed. The formatted information is contained in a webpage and transmitted to a client.

Alternative embodiments may display different kind of demographic information associated with the top terms based on various ways of computing aggregate values. For example, the coordinate values for the top terms may be computed using aggregate values that give higher weight to members with under-represented demographics (also referred to as a minority group). For example a top term may be mentioned by a small number of members representing age greater than 65 years along with a large number of members within age group 25-40 years. If it is determined that the range of age corresponding to members over 65 years is under-represented, higher weight is given to those members in the calculation of a weighted average age. As a result the weighted average age of the corresponding term is higher than a value indicated by a simple mathematical average. For each axis representing an aggregate demographic value, the ranges of values are analyzed to determine under-represented ranges. The percentage of members of the forum in a range is compared to the percentage of population in the range based on a sample population independent of the forum, for example based on census data. The number of people that mentioned a top term in the above range is weighted appropriately to arrive at an estimate of the value that would be obtained if the population of the forum was an accurate reflection of the real world population. For example, if the percentage of people in a given range that are members of the forum is N %, and the percentage of people in the same range in a population sample is M %, then the number of members that mentioned a top term in the same range is multiplied by the weight N/M in the calculation of the weighted average.

Since the message logger 240 collects messages in the message log 160 on an ongoing basis, the computation of the top terms 180 and the statistical information associated with the top terms 180 can be repeated periodically. The top terms analytic engine 190 can perform trend analysis of the statistical information associated with the top terms 180 associated with a topic Ti. Such trend analysis shows how a specific kind of statistical information changes over time. For example, if a new advertisement is released by an advertiser, the advertiser can collect statistical information indicative of the effectiveness of the advertisement as well as the variation of the effectiveness of the advertisement over time.

FIG. 7 shows a graphical display of top terms for the topic "politics" with specific terms selected using the checkboxes 630. The frequency 750 of a term is displayed along with the term 730. In certain embodiments the frequency of a term is not displayed with the term but shown as a popup when the cursor hovers over the icon associated with the term. As shown in FIG. 7, the size (e.g., diameter) of the icon representing a term is determined by the frequency of the term. Hence the circle 720 corresponding to term "debate" is bigger than the circle 740 corresponding to the term "economic." The x-axis 710 displays percentage of male members mentioning a term illustrating gender based demographic information of members. Another embodiment can display percentage of female members that mention a term along the x-axis. A person interested in analyzing the topic "politics" may be interested in several observations based on the graphical display of FIG. 7. For example, the term 730 "sociology" was mentioned by a higher percentage of female population compared to the term 740 "economic." Also, the average age of members mentioning the term 730 "sociology" is less than the average age of members mentioning the term 740 "economic" as indicated by the y-coordinate of the corresponding data points.

Figure 8:
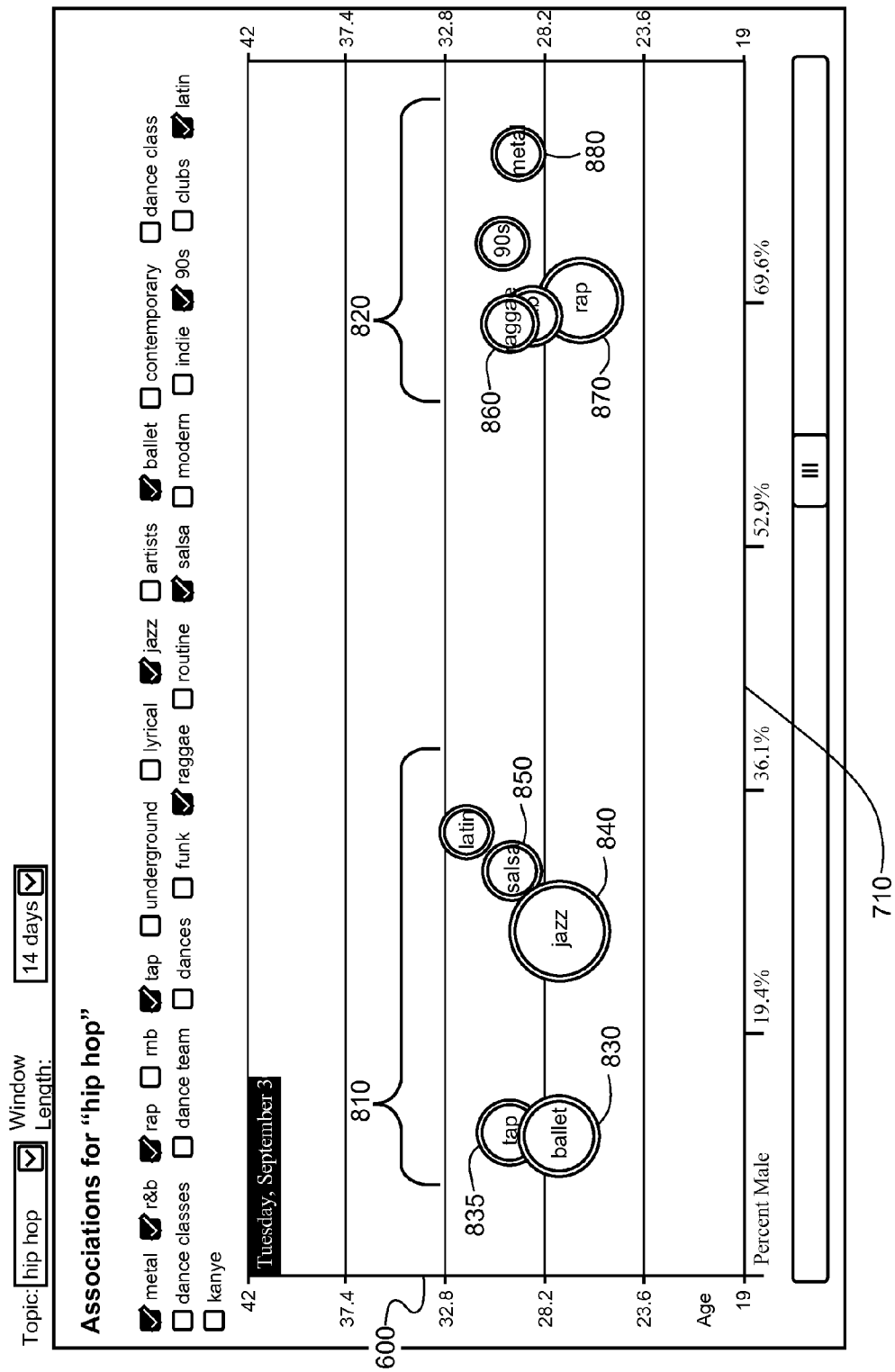
FIG. 8 is an illustration of a graphical user interface showing gender distribution of top terms for topic "hip hop."
Figure 9:
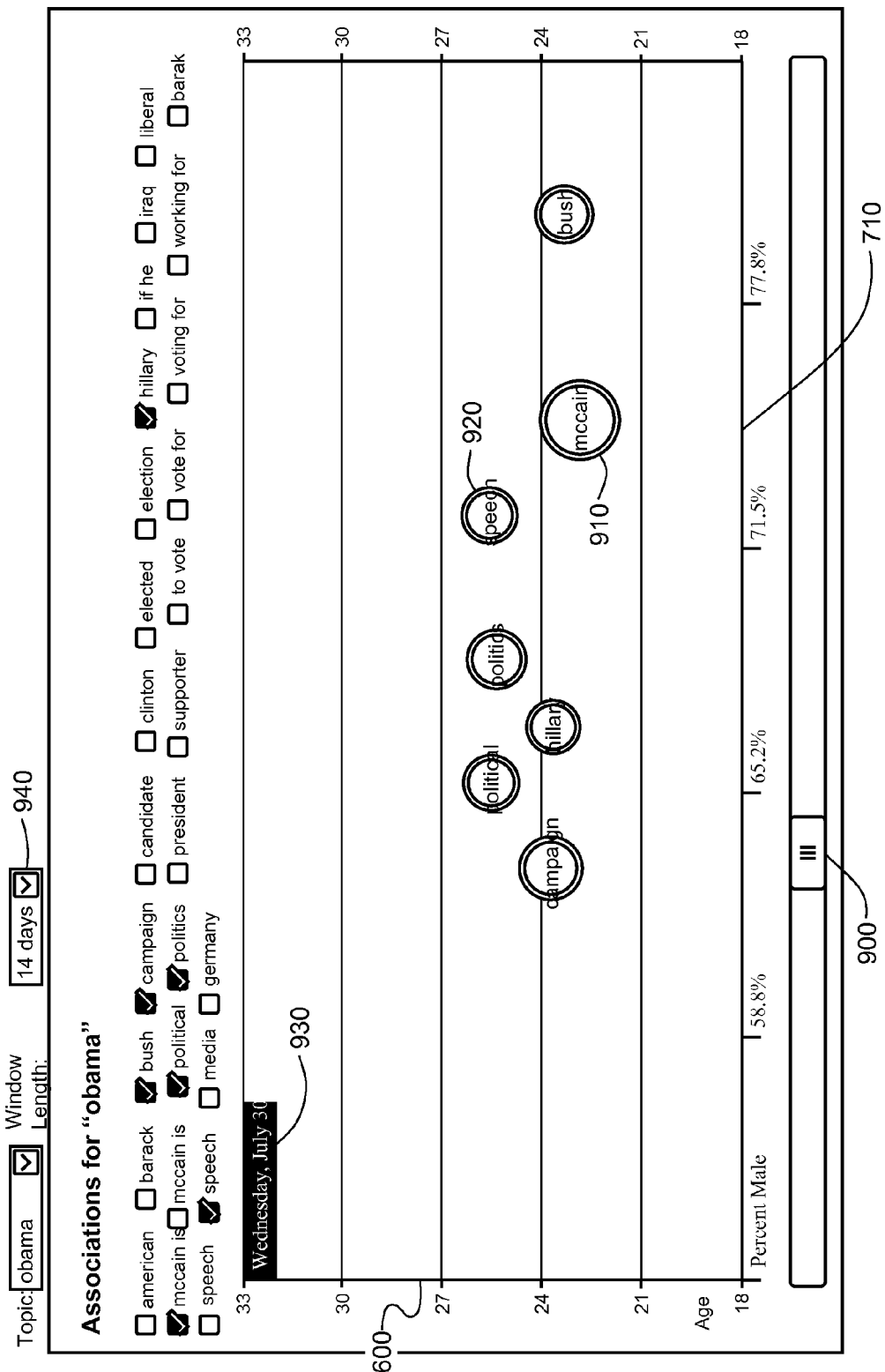
FIG. 9-12 are illustrations of a graphical user interface showing selected top terms for topic "obama" for different time intervals illustrating how the statistics associated with top terms change over time.
Figure 10:
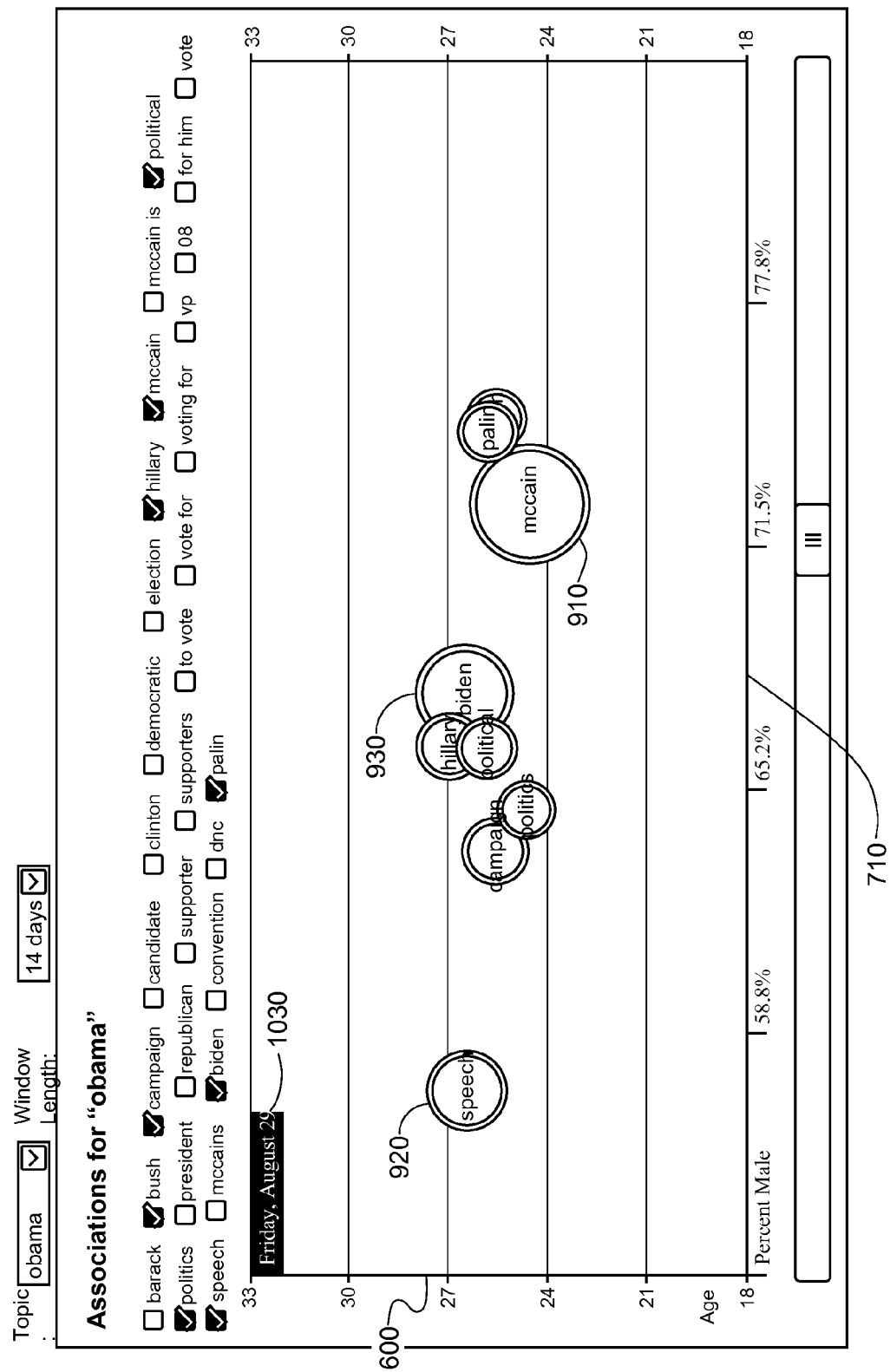

FIG. 8 shows a graphical display of top terms corresponding to topic "hip hop." The terms mentioned by members in relation to the term "hip hop" correspond to various types of music and dances. FIG. 8 shows gender preferences towards specific kinds of music or dances. The terms shown in FIG. 8 can be observed to be divided into two clusters, a cluster 810 of terms mentioned by a predominantly female population and a cluster 820 of terms mentioned by a predominantly male population. Examples of terms belonging to cluster 810 mentioned by a predominantly female population are terms 830 "ballet," 840 "jazz," and 850 "salsa". Similarly, examples of terms belonging to cluster 820 mentioned by a predominantly male population are terms 860 "reggae," 870 "rap," and 880 "metal."

FIGS. 9-12 show how a graphical display of top terms corresponding to a topic can be used to analyze variations of the demographic information over time. The graphical display of top terms for a topic provides a time slider 900 that allows the user to change the time period during which the top terms were mentioned. For example, date 930 indicates the end date of the time interval during which data displayed in FIG. 9 was collected and date 1030 indicates the end date of the time interval during which data displayed in FIG. 10 was collected. Alternative embodiments can use other mechanisms to allow a user to input the date corresponding to the end date of the time interval, for example, a calendar, a drop down list, or a text box for inputting the date in text form. The window length 940 indicates the length of the time interval during which data was collected.

Figure 12:
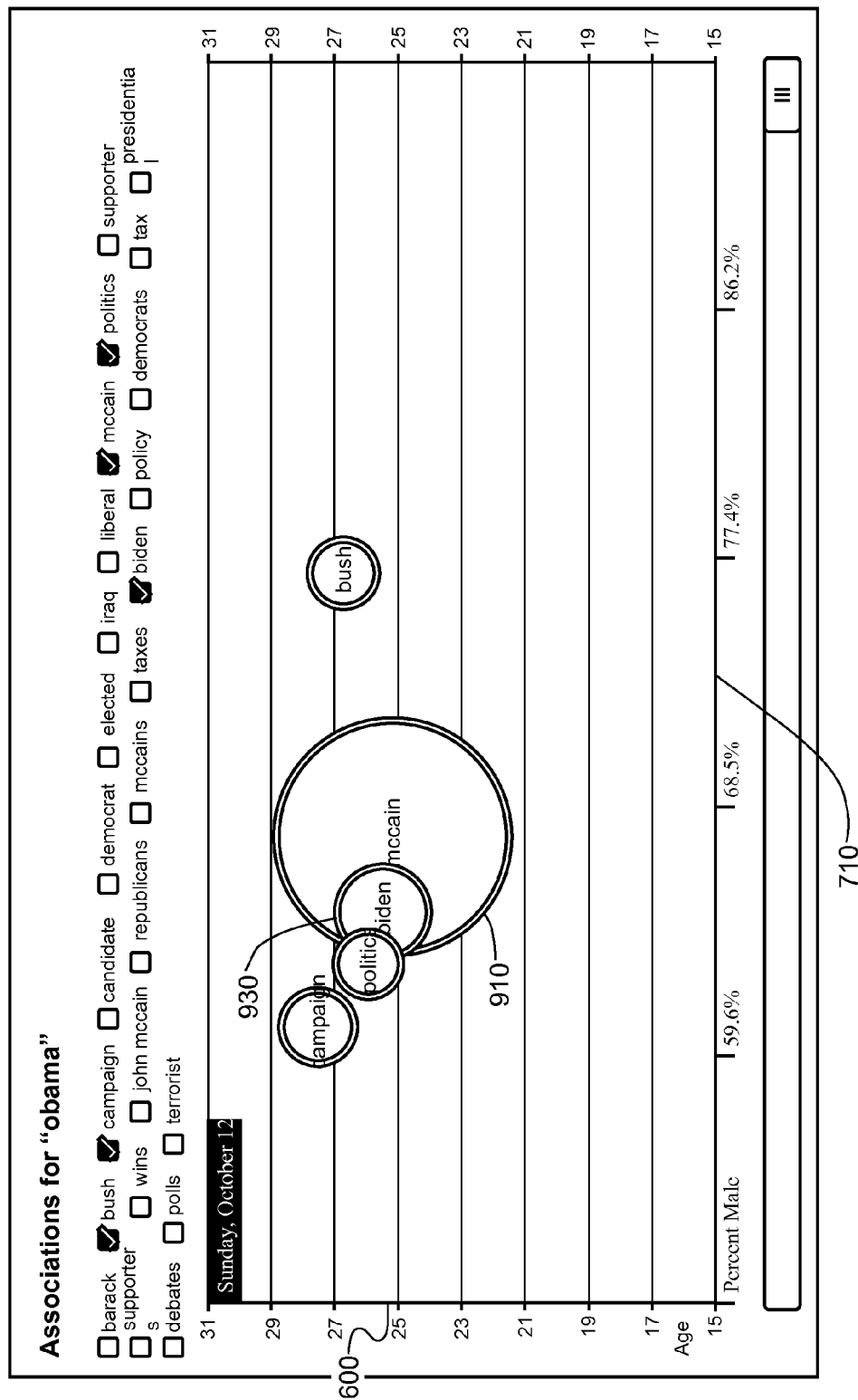

FIGS. 9-12 illustrate how the list of top terms changes over time. For example, the term 920 "speech" appears in the top terms list in FIGS. 9-11 but doesn't appear in FIG. 12. Similarly, top term "biden" does not appear in FIG. 9, but appears in FIGS. 10-12. The size of the circle corresponding to the term 910 "mccain" representing the normalized frequency of occurrence of the term 910 increases with time as shown by FIGS. 9-12. During the time period during which the data displayed in FIGS. 9-12 was collected, the frequency of occurrence of term "mccain" as mentioned by members of the social network along with topic "obama" steadily increased. Also, as illustrated by FIGS. 9-12, during the same period the x-coordinate value corresponding to the term 910 mccain decreased from an approximate 74% (FIG. 9) to 66% (FIG. 12). This illustrates a decrease in the percentage of male population that mentioned the term "mccain" along with topic "obama," or a corresponding increase in percentage of female population that mentioned the term. Similarly, analysis of other aspects of the demographic information associated with top terms corresponding to a topic can be performed.

FIGS. 6-12 also illustrate demographic information corresponding to age and gender of the members. Other embodiments can present different kind of demographic information associated with members, for example, ethnicity, religion, language spoken, location, and the like. Education of the members can be represented, for example, by associating a numeric value to the educational qualification based on the level of education. An example of demographic information based on geographic location is relative distance from a predetermined location, for example, the distance of a member's residence from the downtown of a city. It is also possible to display information other than demographic information, for example, the number of connections of a member may be used as an indication of how social the person is.

Also, note that although FIGS. 6-12 display an x-axis and a y-axis representing demographic information, alternative embodiments may use different number of axes to represent demographic information, for example, a single axis representing demographic information or more than two axes representing demographic information. For example, a bar chart may display particular demographic information along the x-axis and the frequency of occurrence of the terms along the y-axis. Similarly a three-dimensional graph may be used to represent three different kinds of demographic information. A time slider or an alternative mechanism to input the time dimension can be presented with any of the above display mechanisms to analyze variations of top terms with time.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:

storing, by a processor, communications between members of an online forum, each communication representing a message received by the server from a particular client device via a network and sent by the server to another client device via the network;

receiving, by the processor, from a client device, a topic associated with the communications;

determining, by the processor for each of a plurality of terms, a frequency of co-occurrence of the term with the topic in the communications;

selecting, by the processor, a top term from the plurality of terms based on the frequency of co-occurrence of each of the plurality of terms with the topic;

receiving, from the client device, information describing a first time interval selected using a user interface control presented via a display of the client device;

determining, by the processor, a first aggregate demographic value based on a demographic attribute of the members that used the top term during the first time interval;

receiving, from the client device, information describing a second time interval selected using the user interface control, wherein the second time interval is subsequent to the first time interval;

determining, by the processor, a second aggregate demographic value based on the demographic attribute of the members that used the top term during the second time interval; and presenting on the display of the client device, a user interface displaying a graph including at least one axis representing the demographic attribute of the members that used the top term and a geometric shape representing the top term co-occurring with the topic in the communications, the user interface presenting variation of the demographic attribute of the members that used the top term with respect to time based on the first aggregate demographic value and the second aggregate demographic value.

2. The method of claim 1, further comprising:
determining a third aggregate demographic value based on a demographic attribute of the members that used the top term during a third time interval; and
formatting the user interface further based on the third aggregate demographic value.

3. The method of claim 1, further comprising:
determining a second top term associated with the topic based on the communications between the members of the online forum;
determining a third aggregate demographic value based on the demographic attribute of the members that used the second top term during the first time interval;
determining a fourth aggregate demographic value based on the demographic attribute of the members that used the second top term during the second time interval; and
formatting the user interface to further display variation of the demographic attribute of the members that used the second top term with respect to time based on the third aggregate demographic value and the fourth aggregate demographic value.

4. The method of claim 1, wherein the top term is selected based on a normalized frequency of co-occurrence of the top term with the topic.

5. The method of claim 1, wherein the user interface includes an axis representing a second demographic attribute.

6. The method of claim 5, wherein the user interface includes a second axis representing time.

7. The method of claim 1, wherein the demographic attribute comprises age.

8. The method of claim 1, wherein the demographic attribute comprises gender.

9. The method of claim 1, further comprising:
determining an advertisement associated with the top term;
determining a first measure of effectiveness of the advertisement collected over the first time interval based on statistical information describing top terms associated with the first aggregate demographic value; and
determining a second measure of effectiveness of the advertisement collected over the second time interval based on statistical information describing top terms associated with the second aggregate demographic value.

10. The method of claim 9, further comprising:
formatting the user interface to further display variation of the effectiveness of the advertisement with respect to time based on determined first measure of effectiveness and the determined second measure of effectiveness.

11. The method of claim 1, wherein the user interface comprises one of a two-dimensional graph, a three-dimensional graph, and a histogram.

12. The method of claim 1, wherein the user interface comprises an interactive slider configured to the display one of the first aggregate demographic value and the second aggregate demographic value based on the position of the slider.

13. A non-transitory computer-readable storage medium storing computer-executable code comprising instructions for:
storing, by a processor, communications between members of an online forum, each communication representing a message received by the server from a particular client device via a network and sent by the server to another client device via the network;
receiving, by the processor, from a client device, a topic associated with the communications;
determining, by the processor for each of a plurality of terms, a frequency of co-occurrence of the term with the topic in the communications;
selecting, by the processor, a top term from the plurality of terms based on the frequency of co-occurrence of each of the plurality of terms with the topic;
receiving, from the client device, information describing a first time interval selected using a user interface control presented via a display of the client device;
determining, by the processor, a first aggregate demographic value based on a demographic attribute of the members that used the top term during the first time interval;
receiving, from the client device, information describing a second time interval selected using the user interface control, wherein the second time interval is subsequent to the first time interval;
determining, by the processor, a second aggregate demographic value based on the demographic attribute of the members that used the top term during the second time interval; and
presenting on the display of the client device, a user interface displaying a graph including at least one axis representing the demographic attribute of the members that used the top term and a geometric shape representing the top term co-occurring with the topic in the communications, the user interface presenting variation of the demographic attribute of the members that used the top term with respect to time based on the first aggregate demographic value and the second aggregate demographic value.

14. The non-transitory computer-readable storage medium of claim 13, further sending instructions for:
determining a third aggregate demographic value based on a demographic attribute of the members that used the top term during a third time interval; and
formatting the user interface further based on the third aggregate demographic value.

15. The non-transitory computer-readable storage medium of claim 13, further sending instructions for:
determining a second top term associated with the topic based on the communications between the members of the online forum;
determining a third aggregate demographic value based on the demographic attribute of the members that used the second top term during the first time interval;
determining a fourth aggregate demographic value based on the demographic attribute of the members that used the second top term during the second time interval; and
formatting the user interface to further display variation of the demographic attribute of the members that used the second top term with respect to time based on the third aggregate demographic value and the fourth aggregate demographic value.

16. The non-transitory computer-readable storage medium of claim 13, wherein the top term is selected based on a normalized frequency of co-occurrence of the top term with the topic.

17. The non-transitory computer-readable storage medium of claim 13, wherein the user interface includes an axis representing a second demographic attribute.

18. The non-transitory computer-readable storage medium of claim 17, wherein the user interface includes a second axis representing time.

19. The non-transitory computer-readable storage medium of claim 13, wherein the demographic attribute comprises age.

20. The non-transitory computer-readable storage medium of claim 13, wherein the demographic attribute comprises gender.

21. The non-transitory computer-readable storage medium of claim 13, further sending instructions for:
   determining an advertisement associated with the top term;
   determining a first measure of effectiveness of the advertisement collected over the first time interval based on statistical information describing top terms associated with the first aggregate demographic value; and
   determining a second measure of effectiveness of the advertisement collected over the second time interval based on statistical information describing top terms associated with the second aggregate demographic value.

22. The non-transitory computer-readable storage medium of claim 21, further comprising instructions for:
   formatting the user interface to further display variation of the effectiveness of the advertisement with respect to time based on determined first measure of effectiveness and the determined second measure of effectiveness.

23. The non-transitory computer-readable storage medium of claim 13, wherein the user interface comprises one of a two-dimensional graph, a three-dimensional graph, and a histogram.

24. The non-transitory computer-readable storage medium of claim 13, wherein the user interface comprises an interactive slider configured to the display one of the first aggregate demographic value and the second aggregate demographic value based on the position of the slider.

25. The method of claim 1, further comprising:
   determining, by the processor, a plurality of ranges of values of the demographic attribute;
   identifying, by the processor, a range in the plurality of ranges as a minority group if the number of members in the range is below a threshold value,
   wherein each of the first aggregate value and the second aggregate value is determined as a weighted aggregate value of the demographic attribute of the members that used the top term during the first time interval, the weighted aggregate value weighing users of the range identified as the minority group higher than users of one or more other ranges.

* * * * *

UNITED STATES PATENT AND TRADEMARK OFFICE
CERTIFICATE OF CORRECTION

PATENT NO. : 9,826,005 B2
APPLICATION NO. : 13/892296
DATED : November 21, 2017
INVENTOR(S) : Lindsay et al.

It is certified that error appears in the above-identified patent and that said Letters Patent is hereby corrected as shown below:

In the Claims

Column 15, Line 67, after "configured to" delete "the".

Column 18, Line 5, after "based on" insert -- the --.

Column 18, Line 13, after "configured to" delete "the".

Signed and Sealed this
Fourteenth Day of August, 2018

Andrei Iancu
*Director of the United States Patent and Trademark Office*